C. VIRGIN.
FRUIT PICKER.
APPLICATION FILED JUNE 29, 1909.
938,355.
Patented Oct. 26, 1909.
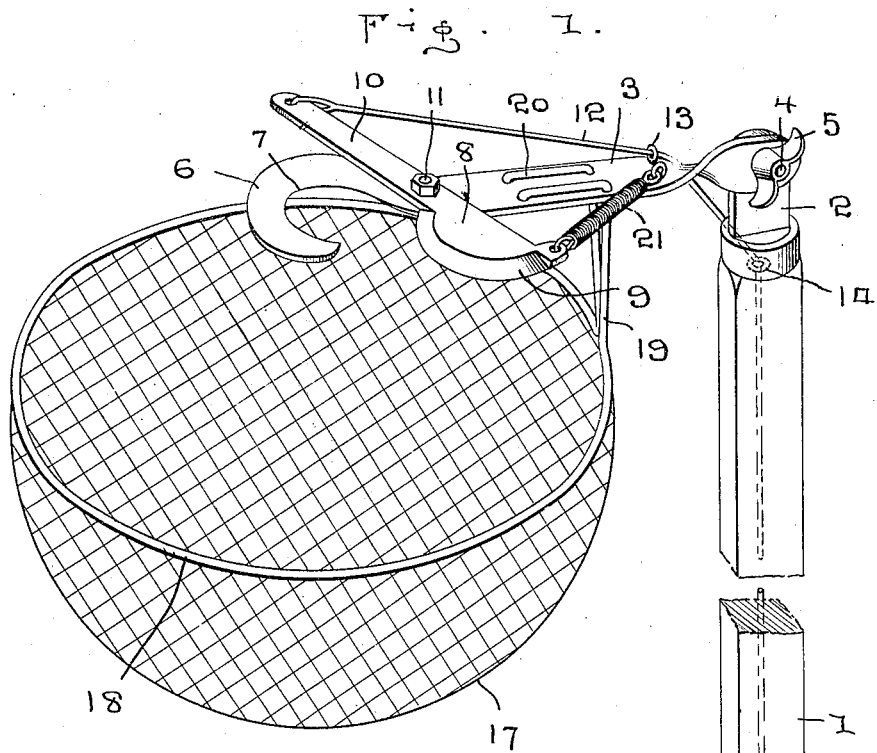
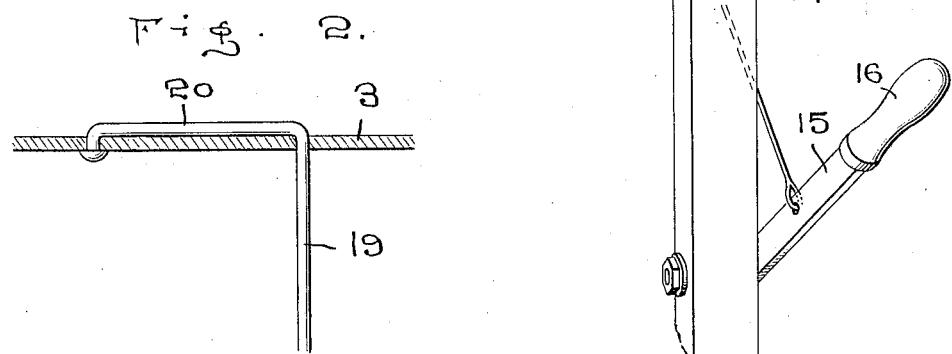
WITNESSES:
INVENTOR
C. Virgin
BY
W. J. Fitzgerald & Co.
Attorneys

UNITED STATES PATENT OFFICE.

CARL VIRGIN, OF BALTIMORE, MARYLAND.

FRUIT-PICKER.

938,355.  Specification of Letters Patent.  Patented Oct. 26, 1909.

Application filed June 29, 1909. Serial No. 504,973.

*To all whom it may concern:*

Be it known that I, CARL VIRGIN, a citizen of the United States, residing at Baltimore, in the State of Maryland, have invented certain new and useful Improvements in Fruit-Pickers; and I do hereby declare the following to be a full, clear, and exact description of the invention, such as will enable others skilled in the art to which it appertains to make and use the same.

My invention relates to new and useful improvements in fruit pickers and more particularly to that class adapted to be used for gathering apples or other fruits such as grow upon trees or tall vines and my object is to provide means for clipping the stems of the fruit and causing the fruit to fall.

A further object is to provide a suitable net or basket for catching the fruit.

A still further object is to provide a staff for extending the net to a considerable height and a still further object is to provide means for operating the clipping device from a point adjacent the lower end of the staff.

Other objects and advantages will be hereinafter referred to and more particularly pointed out in the claims.

In the accompanying drawings forming part of this application, Figure 1 is a detail perspective view showing the picker complete and ready to be applied to use, and Fig. 2 is a detail sectional view showing one manner of attaching the net to parts of the picker.

Referring to the drawings in which similar reference numerals designate corresponding parts throughout both views, 1 indicates a staff which is formed of considerable length and which is provided at its upper end with an upwardly extending shank 2, to which is pivotally secured the body 3 of my improved clipping device, said body being adjustably attached to the shank by introducing a bolt 4 through the shank and body and clamping the same thereon through the medium of a wing nut 5 and by attaching the body in this manner, it will be readily seen that said body can be adjusted to various angles.

The outer end of the body 3 terminates in a hook 6, the inner edge of which is beveled to form a cutting edge 7 and coöperating with said hook is a blade 8, one edge of which is preferably curved and beveled to form a cutting edge 9, which coöperates with the curved cutting edge 7 of the hook, whereby when the blade is swung over the hook, the object engaged with the hook will be severed.

The blade 8 terminates in a bar 10, which bar is pivoted to the body 3 through the medium of a bolt or pin 11, the free end of the bar extending a distance beyond one edge of the body 3, whereby the blade may be readily swung on its pivot and in order to readily accomplish this result, particularly when the cutting device is elevated to some extent, one end of a cable 12 is attached to the outer end of the bar 10 and extended through eyes 13 and 14 on the body 3 and staff 1, respectively, the lower end of said cable being attached to a lever 15, whereby when the lever is swung downwardly, the blade 8 will be operated to sever the object engaged by the hook 6.

One end of the lever 15 is pivoted to the staff 1, while the opposite end thereof is provided with a handle 16, whereby said lever may be readily operated and it will be readily seen that by attaching the cable 12 to the lever 15 at a point a distance from its pivot, the downward swinging movement of the lever will move the cable lengthwise and operate the cutting blade to which it is attached.

Immediately below the hook 6 is a net or basket 17, which is preferably composed of loosely woven material and is adapted to catch the fruit as the retaining stems are severed by the cutting blade, said net being supported by a band 18, preferably of wire, said band having its ends 19 extended upwardly and through the body 3, the extreme upper ends 20 being then bent downwardly and over the upper face of the body and again introduced through the body 3, where they are upset or riveted to securely anchor the same to the body.

The blade 8 is normally held in its open position by means of a spring 21, one end of which is attached to the outer end of said blade, while the opposite end thereof is attached to the body 3, the tension of said spring being such as to normally hold the blade in its open position.

In operation, the body 3 is placed at the proper angle and the nut 5 turned onto the bolt with sufficient pressure to hold the body in its adjusted position when the hook 6 is placed into engagement with the stem of the fruit to be gathered and a downward pull made on the lever 15, this operation swinging the blade 8 on its pivot and clipping the stem engaged by the hook and in view of the leverage obtained by arranging the device as shown, a stem of considerable dimension may be clipped. It will further be seen that by providing the form of net as disclosed, the clipping device may be readily introduced below the fruit to catch the same when the supporting stem is clipped and without coming in contact with the branches of the trees or vines upon which the fruit is growing. It will further be seen that the body 3 may be thrown upwardly in alinement with the axis of the staff 1 and the cutting device used for pruning purposes and if desired, the band 18 may be removably attached to the body 3, whereby the basket can be removed when the device is used for pruning.

What I claim is:

1. In a fruit picker, the combination with a staff; of a body adjustably secured to said staff, said body terminating in a hook at its free end, the inner edge of which is beveled, a blade having a cutting edge adapted to coöperate with the hook to sever an object engaged by the hook, a bar extending from said blade, means to pivotally attach the bar and blade to the body, means to normally hold the blade in its open position, a basket comprising a band, the ends of which are extended upwardly and secured to the body, portions of said ends extending over the body, a net attached to said band and means to swing said blade on its pivot, whereby the object engaged by the hook will be severed.

2. In a fruit picker, the combination with a staff having a shank at its upper end; of a body coöperating with said shank, means to adjustably attach the body to the shank, a hook at the free end of said body having its inner edge beveled to form a cutting edge, a blade pivotally attached to said body and having a cutting edge adapted to coöperate with the cutting edge of the hook, a bar integral with said blade, a basket carried by said body a spring attached at one end to said blade and at its opposite end to said body, adapted to normally hold the blade in its open position, a lever pivotally attached to said staff adjacent the lower end thereof, a cable extending between said lever and free end of said bar and eyes on said body and staff, through which said cable extends.

3. In a fruit picker, the combination with a staff, a body adjustably attached to said staff and a clipping device on said body; of a basket comprising a band formed of wire, the ends of said band being extended upwardly and through the body, portions of said ends being extended over the body, means to secure the ends to the body and a net carried by the band.

In testimony whereof I have signed my name to this specification in the presence of two subscribing witnesses.

CARL VIRGIN.

Witnesses:
  FRANK BELL,
  ELIZABETH HILKERT.